Figure 9:
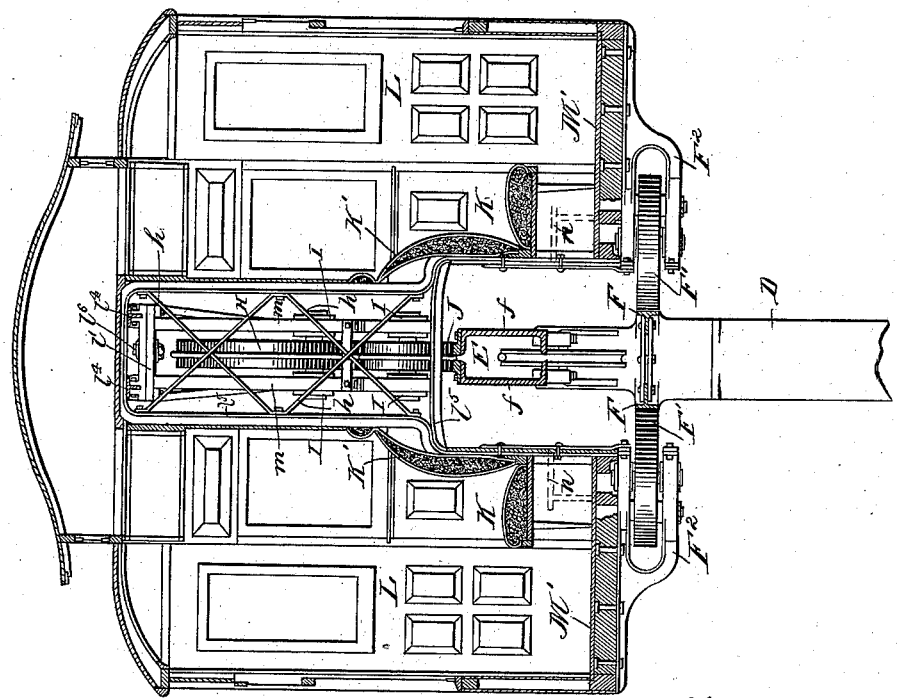

(No Model.) 9 Sheets—Sheet 1.
J. W. ADAMS.
ELEVATED STREET RAILWAY SYSTEM.
No. 382,347. Patented May 8, 1888.
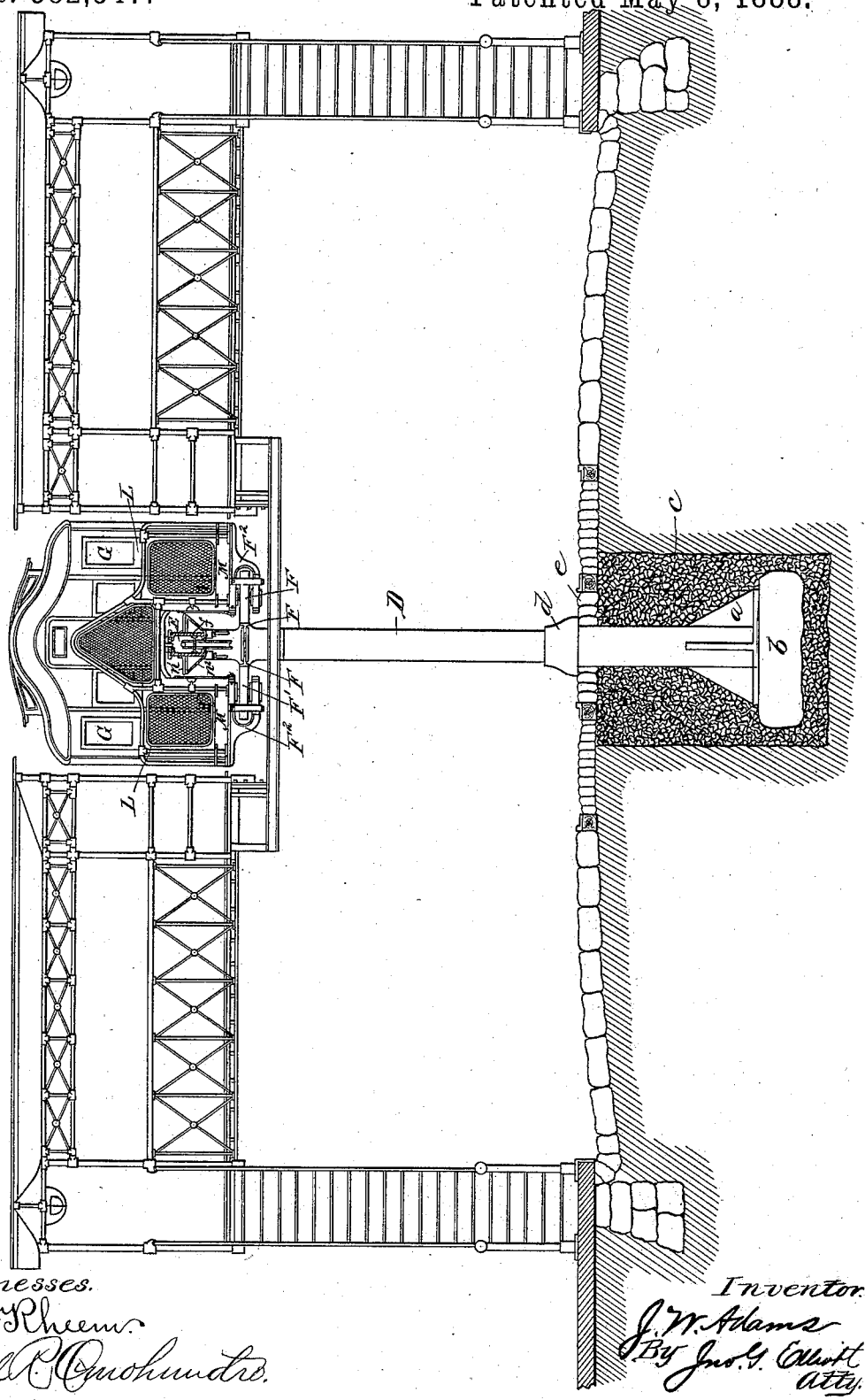

(No Model.) 9 Sheets—Sheet 2.
J. W. ADAMS.
ELEVATED STREET RAILWAY SYSTEM.
No. 382,347. Patented May 8, 1888.
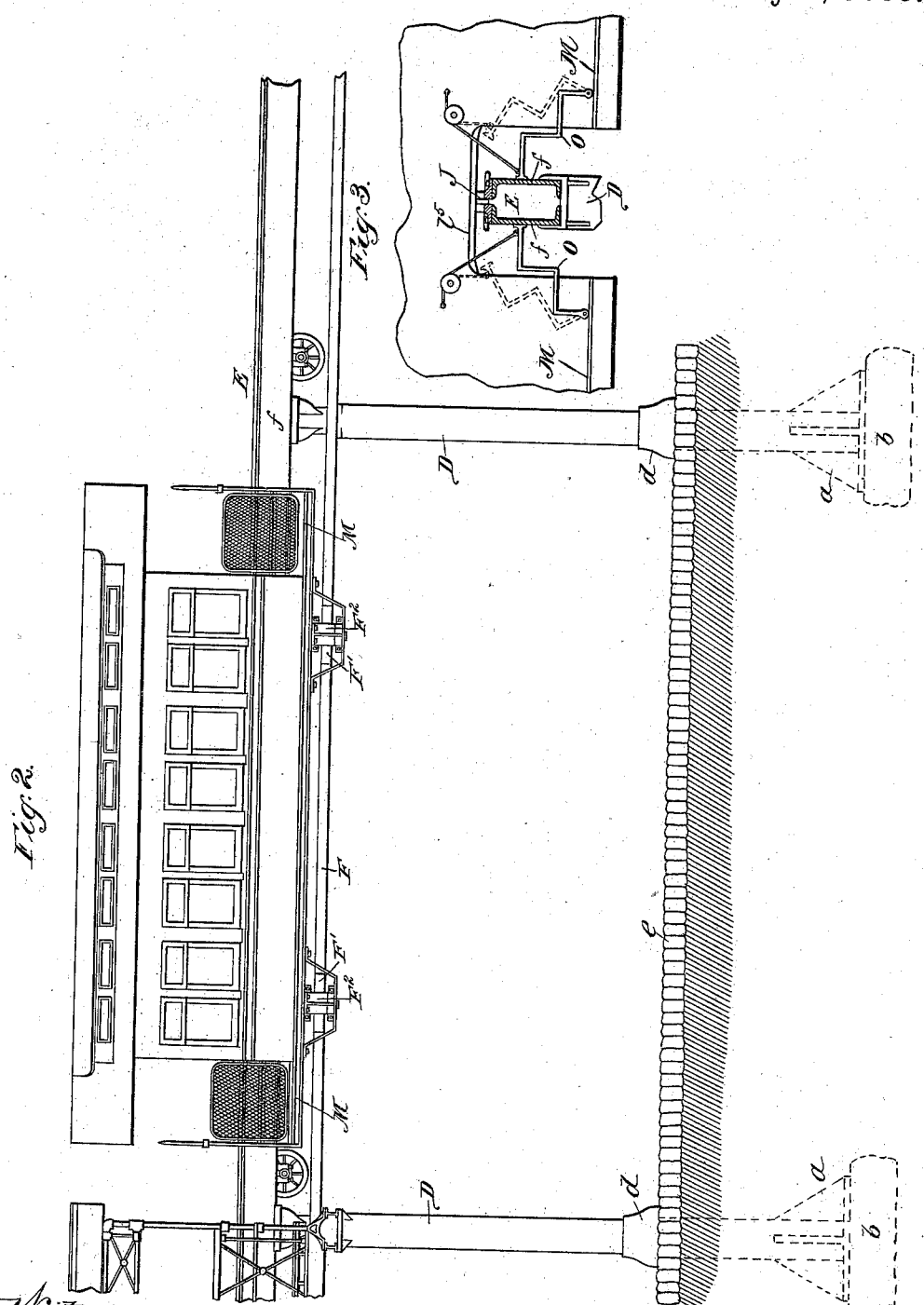
Witnesses.
Wm Rheem
Will P. Onchundro
Inventor.
J. W. Adams.
By Jno G Elliott
Atty.

(No Model.) 9 Sheets—Sheet 3.
J. W. ADAMS.
ELEVATED STREET RAILWAY SYSTEM.
No. 382,347. Patented May 8, 1888.
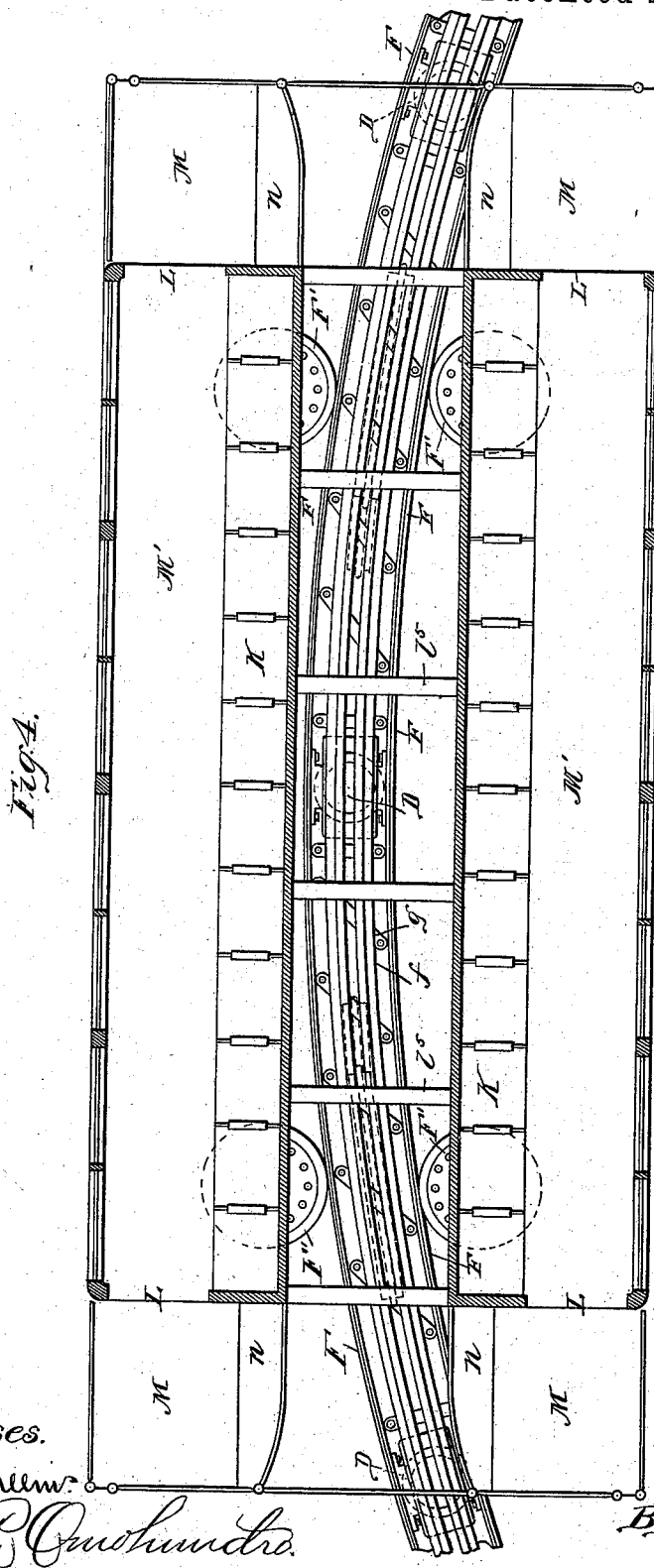
Witnesses.
Inventor.

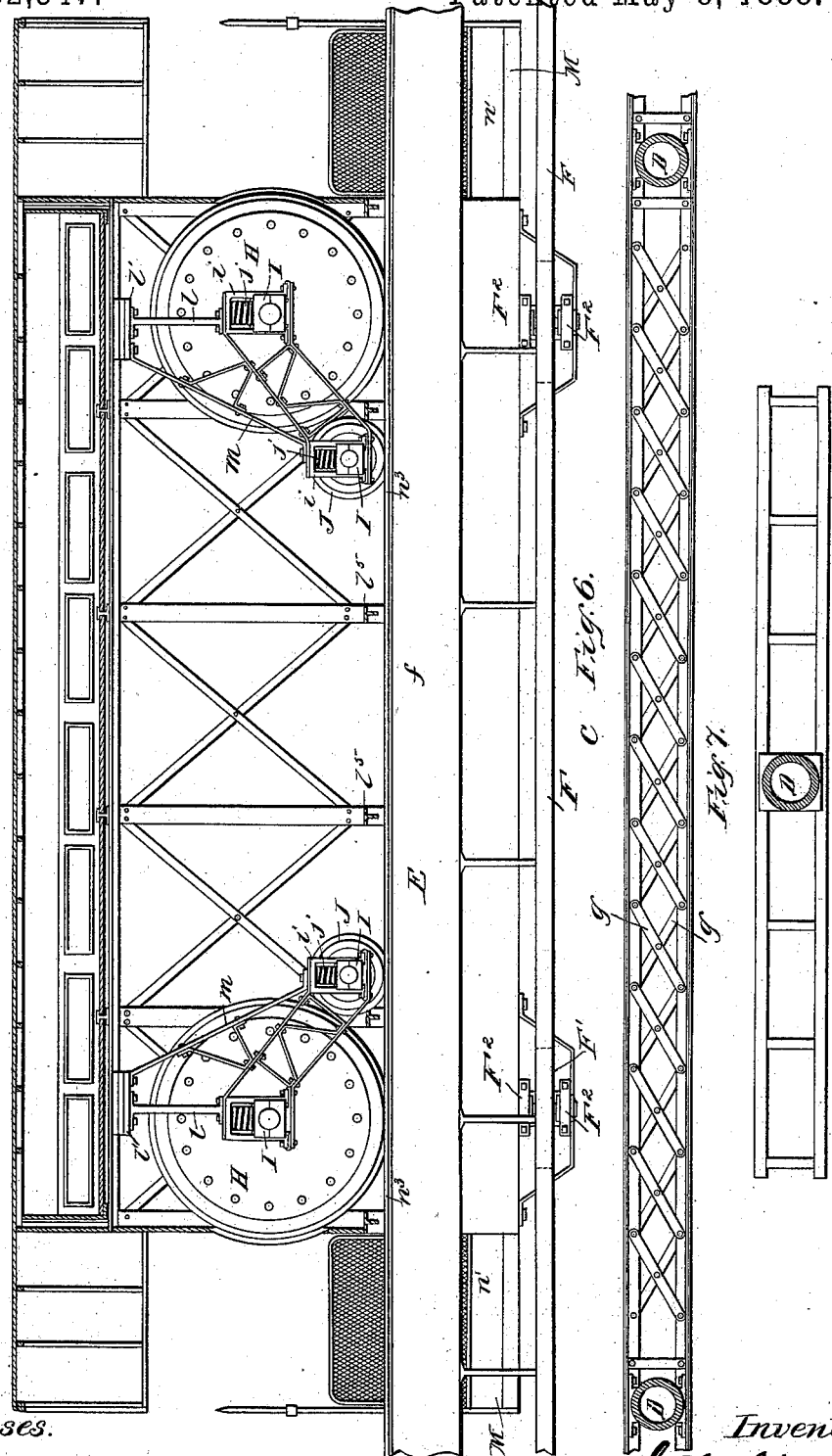

(No Model.) 9 Sheets—Sheet 5.

J. W. ADAMS.
ELEVATED STREET RAILWAY SYSTEM.

No. 382,347. Patented May 8, 1888.

Witnesses.

Inventor.
J. W. Adams.
By Jno. G. Elliott
atty.

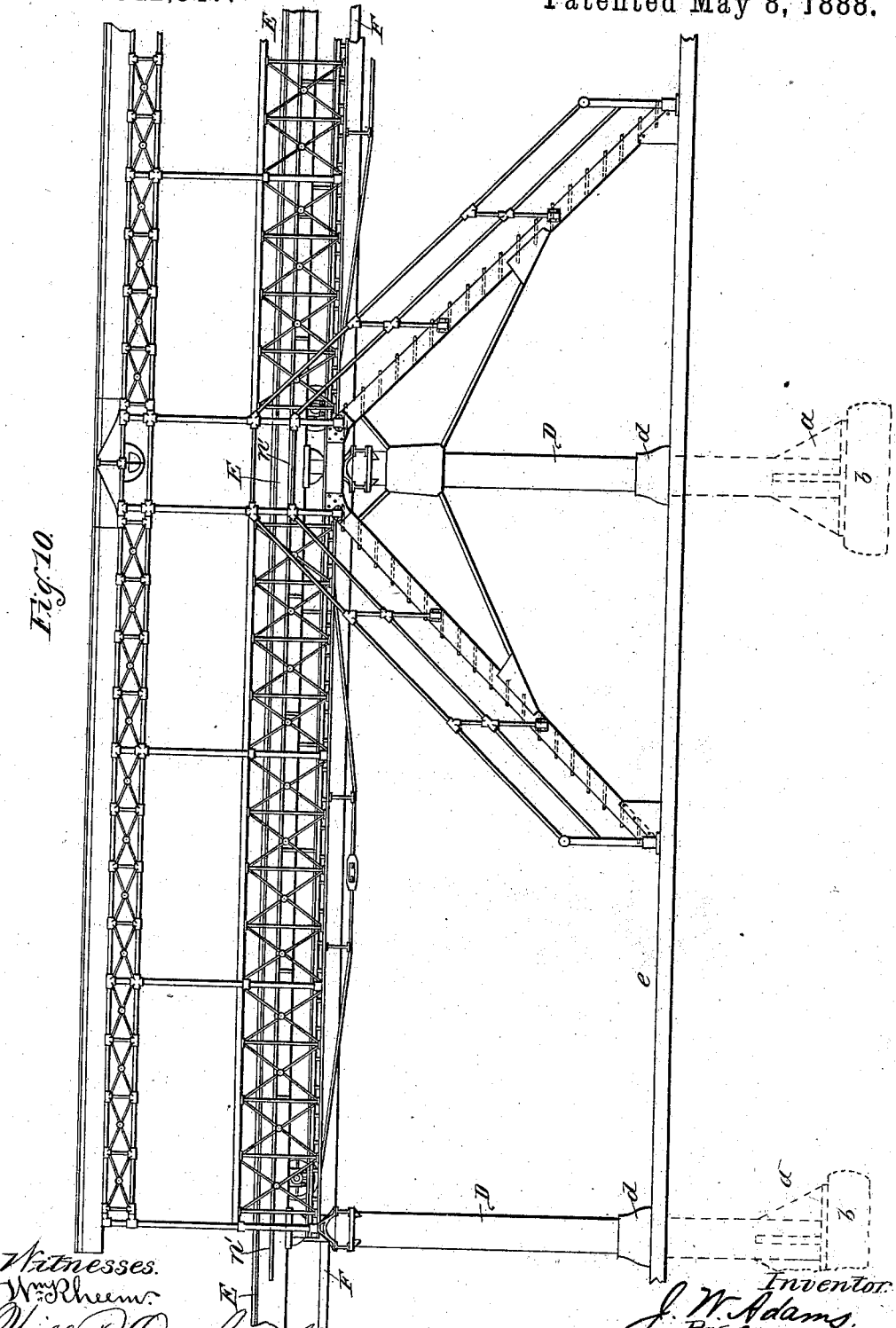

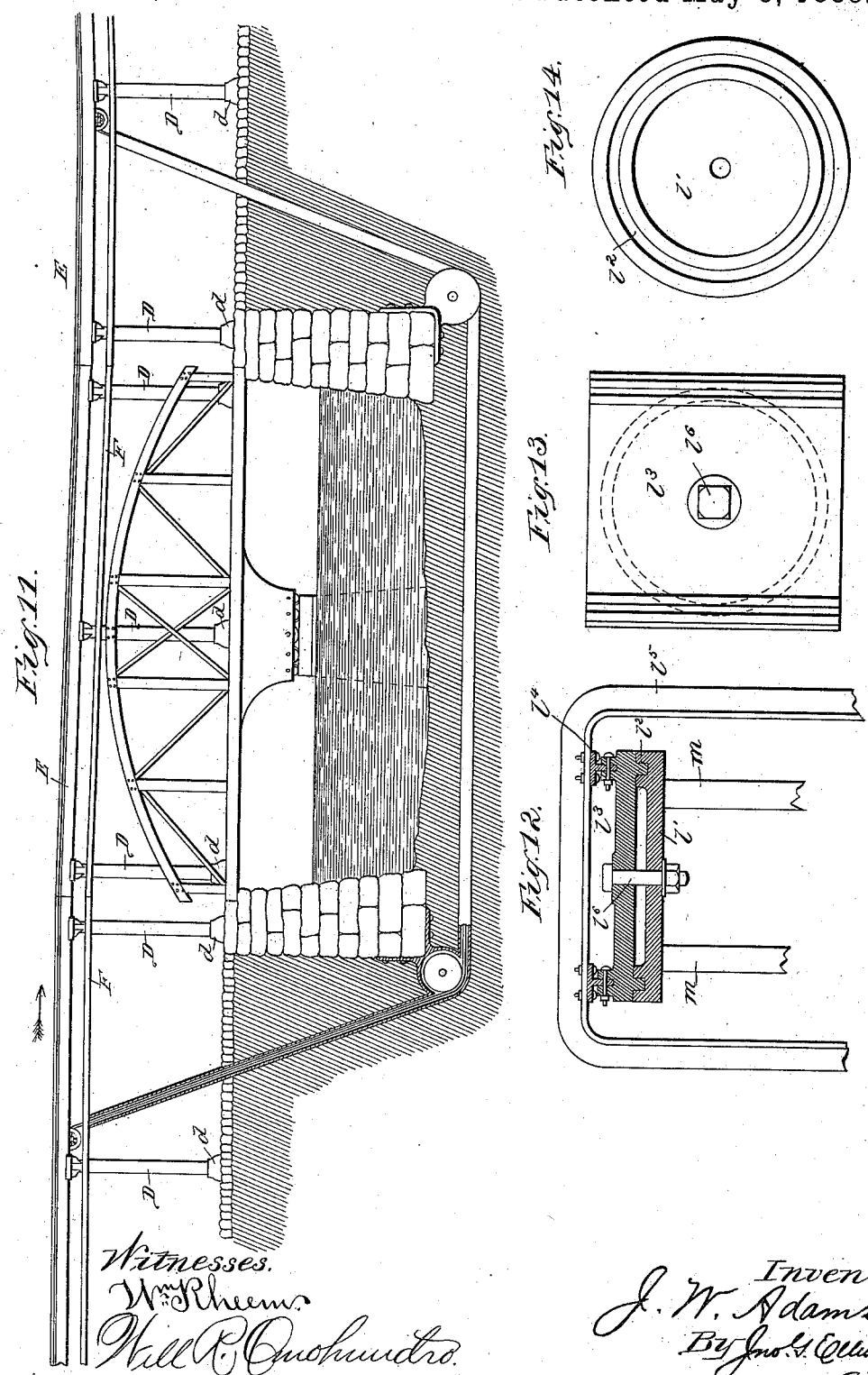

(No Model.) 9 Sheets—Sheet 8.
J. W. ADAMS.
ELEVATED STREET RAILWAY SYSTEM.
No. 382,347. Patented May 8, 1888.
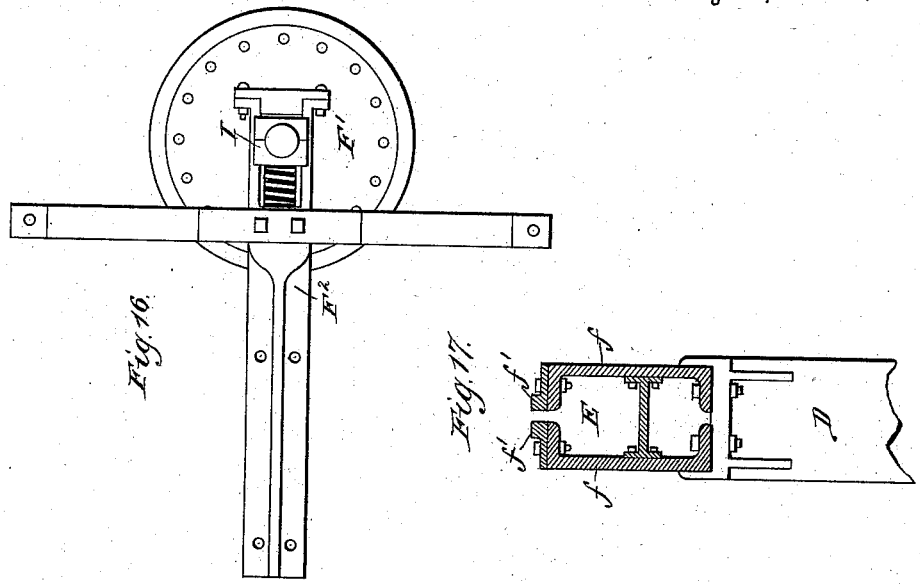
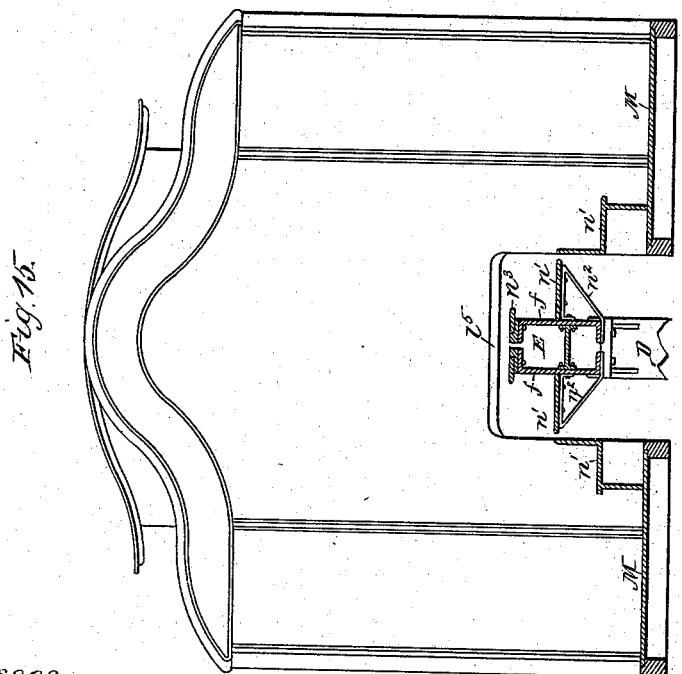
Witnesses.
Inventor.
J. W. Adams
By Jno. G. Elliott
Atty.

(No Model.)　　　　　　　　　　　　　　　　　9 Sheets—Sheet 9.
J. W. ADAMS.
ELEVATED STREET RAILWAY SYSTEM.
No. 382,347.　　　　　　　　　　　　Patented May 8, 1888.
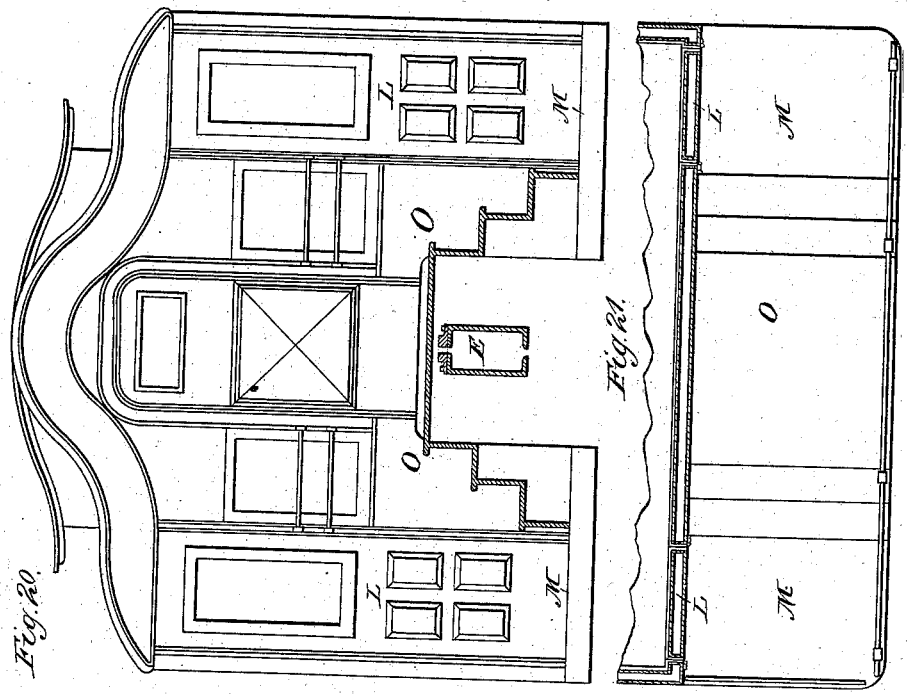
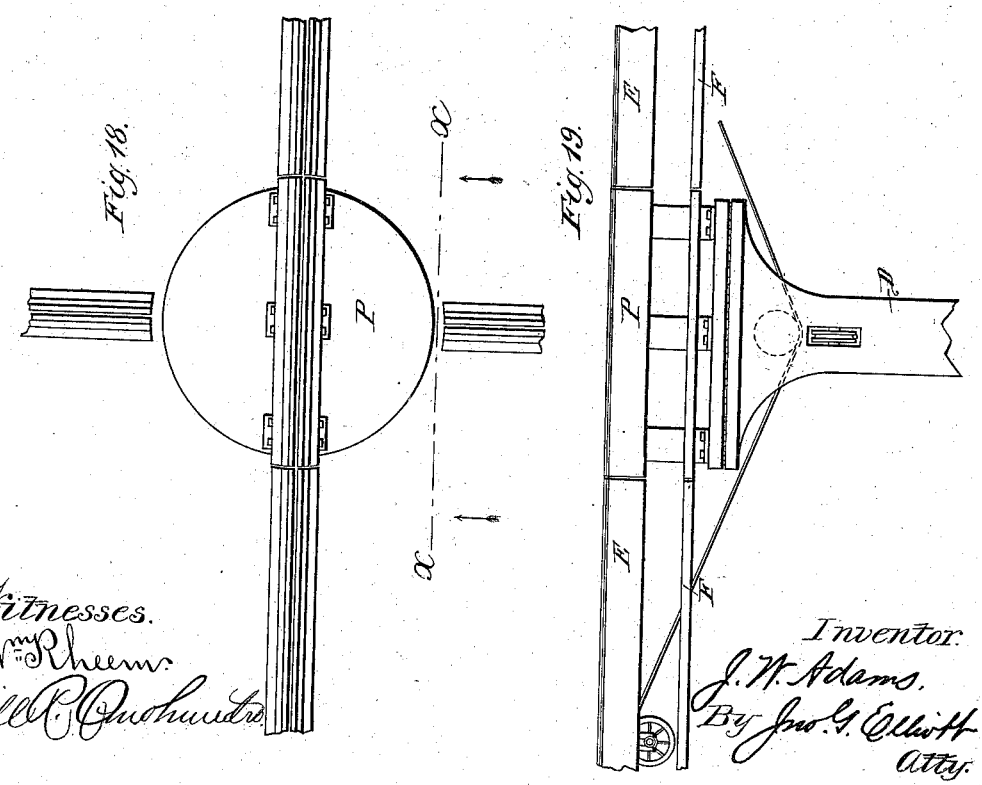

UNITED STATES PATENT OFFICE.

JAMES W. ADAMS, OF CHICAGO, ILLINOIS.

ELEVATED STREET-RAILWAY SYSTEM.

SPECIFICATION forming part of Letters Patent No. 382,347, dated May 8, 1888.

Application filed November 29, 1887. Serial No. 256,388. (No model.)

*To all whom it may concern:*

Be it known that I, JAMES W. ADAMS, a citizen of the United States, residing in Chicago, county of Cook, and State of Illinois, have invented certain new and useful Improvements in Elevated Street-Railway Systems, of which the following is a specification.

This invention relates to improvements in elevated-railway systems in which the cars are supported by a single rail elevated above the street by means of a single line of post-and-stringer structure, and distinguished from elevated-railway systems in which the cars are supported by parallel rails elevated above the street by means of a post-supported trussed structure.

The objects of this invention are to avoid, as nearly as possible, the obstruction of traffic on the streetway and sidewalk, and at the same time produce an elevated-railway system of such a character that will not substantially mar the appearance of the street, and that the noise of the running trains shall be reduced to a minimum degree and the convenience of access to and from elevated cars be promoted to a maximum degree. The importance of these objects and the advantage accruing to their attainment are apparent when it is remembered that all elevated-railway systems now use parallel rails, requiring as supports an elaborate truss and cross-tie structure, necessarily so heavy that massive pillars set at close intervals of each other are required to elevate and support the structure above the roadway. The massiveness of such a structure as a whole is not only objectionable because of its cost, but because the pillars are a serious obstruction to either street or sidewalk traffic; and because of their massiveness and closeness of arrangement to each other they almost wholly destroy a view of the streetway from the sidewalk, and vice versa. Furthermore, the truss and cross-tie structure is so extensive and complex that light and air are materially excluded from the streetway and the houses, while the good appearance of the street is wholly destroyed. Again, double-rail elevated structures unavoidably produce a noise in the street and jarring action to the buildings and walks along their line infinitely greater than that produced by a single-rail system, not only because the numerous braces produce a noise corresponding with the extensive vibration, but because of the almost continuous hammering of the wheels first against one rail and then against the other during the running of the trains, and to this may be added the effect produced by the entire bottom of the car and the cross-ties, which in effect become sounding boards. Furthermore, the trussing necessary for the support of a double-track system requires an elevation of the track above the roadway to such a height that access to the cars is so laborious and tiresome as to be seriously objectionable to persons in the best of health, to say nothing of those in ill health or fatigued before attempting to ascend to the cars. These objectionable features of the elevated roads now in use are so well known that the public generally protest against their erection, and the property-holders and business-men along the proposed line of such a road will submit to the horse car and omnibus rather than give their consent to the erection of elevated structures, although conceding the importance and desirability of the rapid transit they afford. Broadly considered, single-track-rail elevated-railway systems were old prior to my invention, but have never gone into use even to a limited extent, because impractical, and for the reason that they have not been provided with any means for enabling the cars to pass around the sharp curves absolutely necessary in such systems for conducting the cars from one street to another, and for enabling the employment of a continuous trackway passing up one street and down another; nor have these prior constructions of single-track elevated-railway systems disclosed any practical means of access to the cars either to or from the stations, which is another reason why they have not been used to any substantial extent, although at the same time their cost of erection, the reduction in power required to run the cars, the reduction in noise, obstruction to the street, and promotion of accessibility over the double-rail-track systems have been fully conceded by every one who has compared them with the double-rail structures. It is the perfection of the single-track elevated systems to a degree necessary for their practical operation that this invention is directed; and in carrying out my invention I propose to use the devices and mechanisms and the peculiar arrangement thereof illustrated in the accompanying drawings, in which—

Figure 8:
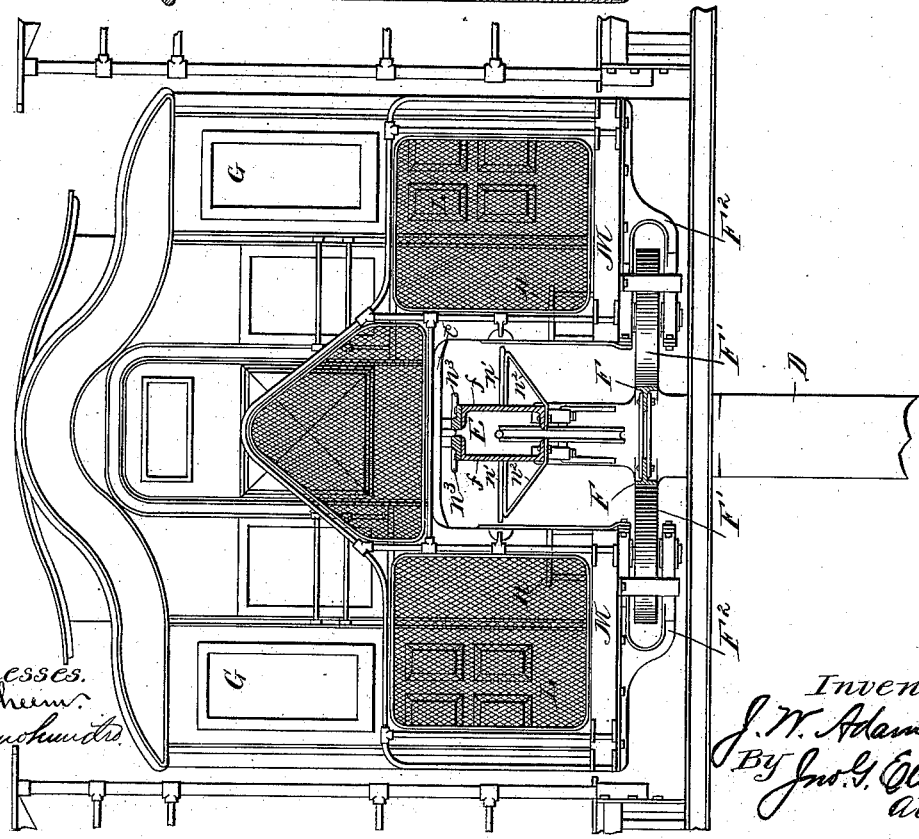

Figure 1 represents an end elevation of an elevated-railway system embodying my invention; Fig. 2, a side elevation of the same; Fig. 3, a detail view of a modified form of the car-steps; Fig. 4, a bottom plan view of a part of my invention, showing one of the cars turning a curve; Fig. 5, a longitudinal section of the same through one of the cars, showing the trackway in side elevation; Fig. 6, a bottom plan view of the tracks for the guide-wheels of the cars; Fig. 7, a similar view of the connection-braces between the platforms of opposing stations; Fig. 8, an enlarged end elevation of one of the cars and a portion of the opposing stations; Fig. 9, a central transverse section through one of the cars; Fig. 10, a side elevation of one of the stations and the approaches thereto; Fig. 11, a partly-sectional view showing the adaptation to my system of cable-power necessarily crossing a stream of water, and also the proposed inclination of a turn-bridge track for impelling the cars across the bridge after they are released from the impelling-power of the cable; Fig. 12, a transverse sectional view of the turn-table or swivel-joint of the car-wheels; Fig. 13, a top plan view of the same; Fig. 14, a top plan view of the lower half or base-plate of the turn-table; Fig. 15, an enlarged sectional view of the car and rail steps for crossing from one side of the car to the other; Fig. 16, an enlarged detail side elevation of one of the car-wheels and its support. Fig. 17, an enlarged detail end elevation of the car-wheel rail and the supports therefor, for more clearly showing the form therefor and the means for securing the several parts together; Fig. 18, a plan view of a rotatable switch for the purpose of switching the cars from one to the other of cross-tracks; Fig. 19, a side elevation of the same, also showing means for directing a power-cable below and out of the way of said switch without interfering with the running of the cable; Fig. 20, an end view of one of my cars, showing in section a fixed and stepped and continuous platform, and the rail and the relative position of these parts to each other; Fig. 21, a top plan view of said platform and steps.

Similar letters of reference indicate the same parts in the several figures of the drawings.

The rails of my system are supported by posts D, at intervals of each other, the said posts being preferably cast hollow and set in a line in the middle of the street and provided at their lower ends with laterally-extending flanges $a$, which serve to promote their anchorage when the post is supported upon a stone foundation, $b$, sunk in the ground to a suitable depth and surrounded by a filling of stone, cement, or other suitable and usual filling material, $c$, usually employed for similar purposes, the posts being provided with a shoulder, $d$, next the upper surface of the street-paving $e$, as shown in Fig. 1; but such shoulder or collar is of no especial importance except as a finish for the securing-base of the post. Mounted upon and projecting above these posts is a track-rail, E, (see Figs. 1, 5, 8, and 9,) preferably composed of two channel-irons, $f$, opposing each other, but separated where they form the bearing-surface for the car-wheel, for the purpose hereinafter described. Some distance below this car-track, and on each side of the posts, are parallel guide-tracks F, which, as shown in Fig. 6, are bolted to flanges on the posts, and are connected and braced by a series of braces, $g$, bolted to said guide-rails and to each other, the guide-rails preferably being for that purpose a T-rail, as shown in Fig. 8, but may be of any other suitable form.

On the under side and toward each end of the two car-sections are opposing guide-wheels F' F', which engage the guide-rails, and for this purpose are horizontally arranged and journaled in suitable brackets, F², bolted to the sills of the car. These guide-wheels F' have sliding journal-boxes, as shown in Fig. 16, like those employed for the car-wheels, so that said guide-wheels may yield laterally and thereby be held in contact with the rails at all times—that is, both when the car is upon a straight line or curved track. These guide-wheels, owing to their arrangement and bearing below and at a right angle to the car-wheels, serve to prevent the car from a lateral motion and to perfectly steady it both when running on a straight line and curve, and by the spring-seating of these guide-wheels any tendency to a jerking or sudden lateral motion of the car is prevented.

As will now be understood, my track-rail consists of a practically single car-wheel rail, parallel guide-rails below the same, and as a result any car used upon such a structure is entirely supported and must run upon a single rail, but is prevented from a lateral motion and any tendency to turn over or fly the track by means of opposing wheels embracing the guide rails; and, furthermore, the car must depend—that is to say, a portion of it extends below and on each side of the car-track. In other words, my cars are practically in two sections, G G, separated from each other, except at their upper portion and top, but rigidly connected to each other by suitable brace-rods and the end panels of the car above the track, the space or channel thus formed between the two sections being of such a width proportioned to the length of the car that the car may travel on the necessary curves in an elevated-railway system. In this channel between the car-sections, and well toward each end of the car, are the car-wheels H H, journaled in boxes I, between which and their supporting and guide frame $i$ are springs $j$, so that the wheels are spring-seated. This frame $i$ is secured to hangers bolted to the base $l'$ of a turn-table, the said base having near its periphery an annular groove, $l^2$, in which fits the corresponding flange of the upper turn-table plate, $l^3$, which is bolted to a T-iron, $l^4$, in turn secured to a yoke or arch, $l^5$, for which the bars $h$ are braces, which yoke extends on each side of the car-channel its entire depth and is bolted to the car-frame and its sills. The two parts of the turn-table are secured together by a king-bolt, $l^6$. By these means the car is virtually saddled upon the track and through the medium of the yoke $l^5$ and the car-wheels in such a manner that the car cannot possibly jump the track, while the car-wheels are free to turn in conformity with a straight line or with a curve in the track. In this connection it is important to observe that in none of the similar prior constructions are provisions made for permitting the car-wheel to run upon a curved track; and I do not therefore limit myself to the special construction of turn-table or swivel-wheel support shown, for any of the ordinary forms of such turn-tables or swivel-joints may be employed without a departure from my invention, which broadly includes such a single-track wheel having a pivoting-support of such a nature that the car-wheel is adapted to run upon a single-rail track both curved and straight. These car-wheels have double treads with a flange between them projecting in the slot between the rail, whereby the car-wheel is not only maintained on the rails by the flange, but the weight of the car is distributed on each side of the flange, which feature in itself tends to steady and promote directness to the moving car. Furthermore, this construction of a single track and the car-wheel adapts it for use as a cable road, because the slot in the track provides the usual access for the grip to a cable necessarily running in a plane below the track, as is shown in Figs. 8 and 9.

Bolted to the car axle-box frame $i$ and to the lower portion, $l'$, of the turn-table is a downwardly and obliquely extending braced frame, $m$, in the lower and free end of which is a steering-wheel, J, journaled and spring-seated in the frame precisely as the car-wheel H, and running upon the rail of that wheel. This steering-wheel is an important feature of my invention, for the reason that it not only gives direction to but steadies the car-wheel in its forward travel just as does the guide-wheel of a bicycle, and this is true whether the car-wheel is running in a straight line or on a curve, for it turns with the car-wheel because of the attachment of both to the same turn-table. The effect of this directing-wheel is to extend the rail-bearing of the car-wheel and to destroy the natural tendency of the car-wheel to a lateral vibration or movement during its forward travel, for being of a smaller diameter and considerably outside of a line to the axis of the turn-table the directing-wheel responds more quickly to laterally - acting forces, and by a steering action forcibly maintains and directs the car-wheel in a line with the rail, whether the rail be on a curve or on a straight line. This steering and steadying action of the directing-wheel and its effect upon the car-wheel may be substantially promoted by having the car-wheel axle, as shown in Fig. 5, outside of a line through the axis of the turn-table and on the opposite side of said axis to that of the directing-wheel, so that a line through said turn-table axis will fall between the axes of the car and directing-wheels; but it will be no substantial departure from my invention to have the axis of the car-wheel directly under that of the turn-table, for my invention broadly includes the turn-table or swivel-joint, the car-wheel, and the directing-wheel independently of the relative dimensions of said wheel or their manner of connection with the turn-table feature of my device.

It should also be observed that by having the car-wheel so steered and steadied it will run much easier and with much less noise, while at the same time any tendency it may have to cut or jump the track or be injured itself by a lateral movement is materially and substantially reduced. To these ends it will be no departure from my invention to have a separate and independent turn-table for the steering-wheel; but in any event there should be sufficient flexibility to the car-wheel for traversing curves.

In addition to the features of construction of the car already described there are others, such as the seating arrangement and the details of construction providing for access to and exit from either or both sides of the cars to a station or stations. As shown in the accompanying drawings, the seats K extend longitudinally of the car in each section G G, with their backs toward each other and against the inner longitudinal walls of the two sections. By this arrangement of the seat and the seat-backs a straight passage the entire width of the doors L (see Fig. 9) is provided for the entire length of the car in front of the seats, and of such a width that access to and exit from the car are best promoted without disturbing persons already seated, while at the same time those on the seats have a full view of the streets and scenery through the usual side windows of the car, and, besides, the weight of the seated passengers is as nearly as possible next over the bearing of the car on the rail. The entrance to and exit from these cars are made from the platform of a station which is on a level with the car-platforms M M, which in turn are on a plane with the bottom M' M' of each section of the car, (see Figs. 8 and 9;) but in order to provide for crossing from the platform of one car-section to the other section, thence to a station-platform, I have provided on the car-platforms single steps $n$ $n$ (see Fig. 8) and steps $n'$ $n'$, supported by brackets $n^2$, secured to the upper ends of the posts and on each side of the rail-steps $n^3$ $n^3$, so that a passenger in crossing from one section to another first steps on the step $n$, then the step $n'$, and the steps $n^3$ whence he may by the corresponding steps descend to the other platform.

In practice, the step $n^3$ may be omitted and the flat face of the rail used for that purpose;

and in any event the steps $n'$ $n^3$ are used only at and continuous with the length of the station-platforms.

It is proposed to have opposing station-platforms—the one on one side for the entrance of passengers to the car, and the other for their exit—so that incoming and outgoing passengers need not pass each other; and it is to this end for which these steps are mainly provided, for otherwise there is little or no necessity, except for passengers wholly on one side of the car, to cross to the other side in making their exit.

Instead of having a fixed step on the trackway or post and on the car-platform, a hinged pair of steps, $o$, (see Fig. 3,) may be used, which steps are hinged or pivoted at their bottom, so as to be let down against the side of the rail when the car is at a station or at a standstill at any other point, which steps may be raised up by cords or other suitable means, as shown, when they will serve as guards during the motion of the car to prevent passengers from accidentally stepping upon the rail or between the rail and car-platform and thereby endanger their lives. If, however, passengers are permitted to get on and off at both opposing stations, then there is no occasion for the steps at all, except when the section farthest from the platform from which the passenger entered the car contains room when the other section may be full.

Ordinarily opposing station-platforms may be used—the one for entrance to and the other for exit from the cars—in which use the steps from one side of the car to the other will not be and are not designed to be used to any considerable extent; but in crowded portions of large cities, where very rapid transit and short stops are a necessity, the car-steps may terminate and be connected by a platform, O, (see Figs. 20 and 21,) forming a rigid portion of the car, whereby no more than ordinary care in stepping is required to pass from one side of the car to the other, and no danger can possibly arise to persons forced or compelled to stand upon the car-platform during a standstill of the car or when it is in motion. Furthermore, such a construction of the platform provides for the passenger's exit from the car to the station-platform that is least crowded with persons desiring to enter the car.

An elevated-railroad system constructed in accordance with my invention not only has over the double-rail system the advantages of a reduction in cost, in obstructing and disfiguring the street, in noise, in accessibility to the cars, &c., but requires less repair and substantially less power to move and handle the cars; and this latter feature is at the present day of the utmost importance, because of the objections common to the use of steam-engines for propulsion and the demand for and efforts to substitute therefor cables and electric motors, the success of either of which largely depends upon the motive power required to propel the train of cars; and the very fact that substantially less power is required to move cars on a purely single-rail system is in itself, when perfected as a system, a material advance toward permitting the successful use of such motors.

In this connection it should be observed that a system in which the cars are entirely supported by a single rail is a substantially different system from those in which the guide-wheels below the rail proper are set at an oblique angle to their rail, so as to impart support to the car of such systems. The required power to move the car is substantially the same if not greater than in the parallel two-rail systems.

I do not claim, broadly, a single-rail system, nor a single-rail system in which lateral guide-wheels afford no vertical support to the cars; but I do claim that by the devices hereinafter specified I have perfected systems which heretofore have not gone into use because they are devoid of the details necessary for their practical operation.

Instead of having the car-wheels H supported directly upon the face of the angle-iron rails $f$, as before intimated, said rails may be faced with independent rails $f'$, bolted thereto, as clearly shown in Fig. 17, and operating as wearing-faces adapted to be removed and replaced by new ones when for any purpose the same is desirable.

It frequently becomes important and desirable at track-crossings to shift cars from one track to the other; and to this end I employ a revolving switch, P, (shown in Figs. 18 and 19,) which switch is carried by a turn-table of ordinary form mounted upon one of the supporting-posts D of my system, and not only takes the place of the usual siding, but may be used at street intersections and other points where, owing to limited space, such a siding could not be used.

Incidental to my system I have also shown in Fig. 19 a means for conducting power-cables out of the way of said switch by passing them around independent sheaves secured in differing planes and at their proper angle to the post D. Likewise, in Fig. 11, I have also shown a means for conducting a power-cable from one to the other side of a stream of water and for independently impelling the cars across such a turn-bridge. To these ends the cable before reaching the bridge is directed through a passage and over suitable rollers therein, underneath and to the opposite side of the stream, and from points removed from the bridge, while the bridgeway-track is inclined sufficiently to cause the car to traverse more than the length of the bridge, and to the cable at the opposite end of the bridge.

In this connection it should be observed that the track may be slightly inclined for some distance back of the letting-loose point on the cable toward the bridge, so that if for any reason the cars are brought to a standstill just before reaching the bridge they will automatically move forward on the bridge to the cable on the other side the moment their brakes are released.

Having described my invention, what I claim, and desire to secure by Letters Patent, is—

1. In a railway-car, the combination of the car-wheel, a pivot-connection between said car-wheel and the body of the car, and a steering-wheel, substantially as described.

2. In an elevated-railway system, a single-rail track and parallel guide-rails below said track, in combination with a car supported on said single track by a car-wheel, between which and the car there is a pivot-connection, a steering-wheel, a rigid connection between said wheel and the car-wheel support, and horizontal guide-wheels bearing against the parallel tracks, substantially as described.

3. In an elevated-railway system, a single-rail track having at stations steps secured thereto, in combination with a car the floor of which is in a plane below said track, said car being provided with steps providing access to said track, substantially as described.

4. In an elevated-railway system, a single-rail track having secured thereto steps in differing planes, in combination with a car the floor of which is in a plane below said track, said car being provided with steps providing access to said track, substantially as described.

5. In an elevated-railway system, the main and single rail track, in combination with a bridge-section track forming an incline in said main track, substantially as described.

6. An elevated-railway system consisting of a trackway composed of a single-rail track and two parallel rails on each side of and in a plane below the same, mounted upon posts above the streetway, and cars guided by wheels horizontally engaging said parallel rails and supported by car-wheels swiveled to said cars and directed by steering-wheels, substantially as shown and described.

7. An elevated-railway system consisting of a trackway composed of a single-rail track and two parallel rails on each side of and in a plane below the same, mounted upon posts above the streetway, said trackway and posts being without trussing, also cars guided by wheels horizontally engaging said parallel rails and supported by car-wheels swiveled to said cars and directed by steering-wheels, substantially as shown and described.

8. In an elevated-railway system, a trackway composed of a single-rail track, two parallel rails on each side of and in a plane below the same, posts supporting said trackway above the streetway, said trackway and posts being without trussing, cars provided with guide-wheels engaging said parallel rails and supported by swiveled wheels directed by steering-wheels, opposing stations on each side of said trackway having platforms on a plane below the supporting track-rail, and revolving switches at the intersection of cross-tracks, all substantially as shown and described.

In testimony whereof I have hereunto set my hand, this 19th day of November, A. D. 1887, at Chicago, Illinois.

JAMES W. ADAMS.

Witnesses:
LOUIS J. BOWMANN,
W. W. ELLIOTT.